United States Patent
Bonac et al.

(10) Patent No.: US 11,333,561 B2
(45) Date of Patent: May 17, 2022

(54) TEMPERATURE SENSOR FOR FAST MOVING SURFACE

(71) Applicant: FPInnovations, Pointe-Claire (CA)

(72) Inventors: Tomo Bonac, Vancouver (CA); Bruce Lehmann, Surrey (CA); Ahmad Mohammadpanah, New Westminster (CA)

(73) Assignee: FPInnovations, Pointe-Claire (CA)

( * ) Notice: Subject to any disclaimer, the term of this patent is extended or adjusted under 35 U.S.C. 154(b) by 264 days.

(21) Appl. No.: 16/414,089

(22) Filed: May 16, 2019

(65) Prior Publication Data

US 2019/0353535 A1    Nov. 21, 2019

Related U.S. Application Data

(60) Provisional application No. 62/672,770, filed on May 17, 2018.

(51) Int. Cl.
| | | |
|---|---|---|
| *G01K 13/08* | (2006.01) | |
| *B27B 5/29* | (2006.01) | |
| *G01K 7/22* | (2006.01) | |
| *B23D 59/02* | (2006.01) | |

(52) U.S. Cl.
CPC ............ *G01K 13/08* (2013.01); *B27B 5/29* (2013.01); *G01K 7/22* (2013.01); *B23D 59/02* (2013.01)

(58) Field of Classification Search
CPC .......... G01K 13/08; G01K 7/22; B23D 59/02; B27B 5/29
See application file for complete search history.

(56) References Cited

U.S. PATENT DOCUMENTS

| | | | | | |
|---|---|---|---|---|---|
| 4,000,394 | A | * | 12/1976 | Bar-on | G01K 13/08 219/216 |
| 4,567,798 | A | * | 2/1986 | Brdicko | B23D 47/005 125/15 |
| 4,893,663 | A | * | 1/1990 | Ely | B27L 5/02 144/213 |
| 5,123,752 | A | * | 6/1992 | Paz-Pujalt | G01K 13/08 338/23 |
| 5,786,571 | A | * | 7/1998 | Bethel | G03G 15/2039 219/494 |

(Continued)

*Primary Examiner* — Nathaniel T Woodward
*Assistant Examiner* — Philip L Cotey
(74) *Attorney, Agent, or Firm* — Norton Rose Fulbright Canada LLP

(57) ABSTRACT

A temperature sensor device and a system for measuring temperature of a fast moving surface are described herein. A sensor body comprising a temperature sensor for measuring temperature of the moving surface. The sensor body has an engagement surface for contacting the moving surface. A biasing mechanism is coupled to the sensor body for providing pressure to maintain the engagement surface in contact with moving surface and for allowing the engagement surface to pivot with the moving surface when the moving surface deflects. An electronics module is connected to the temperature sensor for determining temperature data indicative of the temperature of the moving surface and for transmitting the temperature data to an external device. The temperature sensor device and/or the system may be used for measuring temperature of a saw blade.

18 Claims, 12 Drawing Sheets

(56) References Cited

U.S. PATENT DOCUMENTS

| | | | | |
|---|---|---|---|---|
| 7,946,505 | B2* | 5/2011 | Lynam | B60H 1/00792 |
| | | | | 236/44 C |
| 10,953,509 | B2* | 3/2021 | Baratta | B23Q 17/00 |
| 2010/0146798 | A1* | 6/2010 | Emmerich | F01M 3/00 |
| | | | | 30/277.4 |
| 2015/0009600 | A1* | 1/2015 | Aromin | H02H 5/042 |
| | | | | 361/106 |
| 2016/0008897 | A1* | 1/2016 | McGehee | B23D 59/02 |
| | | | | 83/22 |
| 2017/0274489 | A1* | 9/2017 | Baratta | B23Q 17/0985 |

* cited by examiner

# TEMPERATURE SENSOR FOR FAST MOVING SURFACE

CROSS-REFERENCE TO RELATED APPLICATION

The present application claims priority from U.S. Provisional Application No. 62/672,770 filed May 17, 2018, the content of which is hereby incorporated by reference in its entirety.

TECHNICAL FIELD

The present disclosure relates generally to temperature sensors, and more particularly, to a temperature sensor device for measuring temperature of a fast moving surface.

BACKGROUND OF THE ART

Saw guide water causes several problems in saw mills. First, the moisture content of sawdust is increased and this raises shipping and drying cost, if it is used for pellets. The water pools in conveyors and basements, and in cold weather wet sawdust can freeze and jam conveyors. Corrosion of machines and conveyor chains increases with added water. Also, many mills have a limited water supply and may not have sufficient water for saw guides, resulting in sawing issues. The cost of oil, which is added to the water, is very high, and adding too much oil to the water is not environmentally friendly.

One potential solution to this problem is to monitor the temperature of the saw and adjust the amount of water/oil mixture based on the needs during the cutting process, which gives a system that uses less water and oil while maintaining the conditions for good saw performance.

However, existing sensors are unable to give an accurate temperature reading of a saw at high speed, survive in a circular saw box and/or are not suitable in certain environments. For example, existing contact-based sensors may only measure a surface moving up to 200 meters/minute (or 656 feet/minute). Furthermore, infra-red (IR) sensors typically do not work well in wet environments because water absorbs IR radiation and/or typically do not work well in dirty or dusty environments because the IR sensor may become blocked.

As such, there is a need for improved temperature sensors for measuring temperature of a fast moving surface.

SUMMARY

In one aspect, there is provided a temperature sensor device for measuring temperature of a moving surface. The temperature sensor device comprises a sensor body comprising a temperature sensor for measuring temperature of the moving surface, the sensor body having an engagement surface for contacting the moving surface. The temperature sensor device further comprises a biasing mechanism coupled to the sensor body for providing pressure to maintain the engagement surface in contact with the moving surface and for allowing the engagement surface to pivot with the moving surface when the moving surface deflects. The temperature sensor device comprises an electronics module connected to the temperature sensor for determining temperature data indicative of the temperature of the moving surface and for transmitting the temperature data to an external device.

In one aspect, there is provided a system for measuring temperature of a moving surface. The system comprises a sensor body comprising a temperature sensor for measuring temperature of the moving surface, the sensor body having an engagement surface for contacting the moving surface. The system further comprises a biasing mechanism coupled to the sensor body for providing pressure to maintain the engagement surface in contact with the moving surface and for allowing the engagement surface to pivot with the moving surface when the moving surface deflects. The system further comprises an electronics module connected to the temperature sensor for determining temperature data indicative of the temperature of the moving surface and for transmitting the temperature data to an external device.

In one aspect, there is provided a temperature sensor device for a sawing machine having a blade. The temperature sensor device comprises a sensor body comprising a temperature sensor for measuring temperature of the blade. The sensor body has an engagement surface for contacting a blade surface of the blade. The temperature sensor device further comprises a biasing mechanism coupled to the sensor body for providing pressure to maintain the engagement surface in contact with blade surface while the blade is moving and for allowing the engagement surface to pivot with the blade surface when the blade deflects. The temperature sensor device further comprises an electronics module connected to the temperature sensor for determining temperature data indicative of the temperature of the blade and for transmitting the temperature data to an external device.

In one aspect, there is provided a system for measuring temperature of a blade of a sawing machine. The system comprises a sensor body comprising a temperature sensor for measuring temperature of the blade. The sensor body has an engagement surface for contacting a blade surface of the blade. The system further comprises a biasing mechanism coupled to the sensor body for providing pressure to maintain the engagement surface in contact with blade surface while the blade is moving and for allowing the engagement surface to pivot with the blade surface when the blade deflects. The system further comprises an electronics module connected to the temperature sensor for determining temperature data indicative of the temperature of the blade and for transmitting the temperature data to an external device.

In one aspect, there is provided a temperature sensor device mountable on a support arm of a sawing machine having a rotatable blade. The temperature sensor device comprises a sensor body comprising a temperature sensor for measuring temperature of the rotatable blade. The sensor body has an engagement surface for contacting a blade surface of the rotatable blade. The temperature sensor device further comprises a biasing mechanism coupled to the sensor body for providing pressure to maintain the engagement surface in contact with blade surface while the rotatable blade is rotating and for allowing the engagement surface to pivot with the rotatable blade surface when the rotatable blade deflects. The temperature sensor device further comprises an electronics module connected to the temperature sensor for determining temperature data indicative of the temperature of the rotatable blade and for transmitting the temperature data to an external device.

In one aspect, there is provided a system for measuring temperature of a rotatable blade of a sawing machine. The system comprises a sensor body comprising a temperature sensor for measuring temperature of the rotatable blade. The sensor body has an engagement surface for contacting a blade surface of the rotatable blade. The system further comprises a biasing mechanism coupled to the sensor body for providing pressure to maintain the engagement surface in contact with blade surface while the rotatable blade is rotating for allowing the engagement surface to pivot with the rotatable blade surface when the rotatable blade deflects. The system further comprises an electronics module connected to the temperature sensor for determining temperature data indicative of the temperature of the rotatable blade and for transmitting the temperature data to an external device.

DESCRIPTION OF THE DRAWINGS

Reference is now made to the accompanying figures in which.

It will be noted that throughout the appended drawings, like features are identified by like reference numerals.

DETAILED DESCRIPTION

A temperature sensor device for measuring temperature of a fast moving surface and a system for measuring temperature of a fast moving surface are described herein. The temperature sensor device is a contact-based device for being in contact with the moving surface while measuring the temperature of the moving surface. In accordance with an embodiment, the temperature sensor device is mountable on a support adjacent a saw having a blade for measuring the temperature of the saw's blade.

Figure 1:
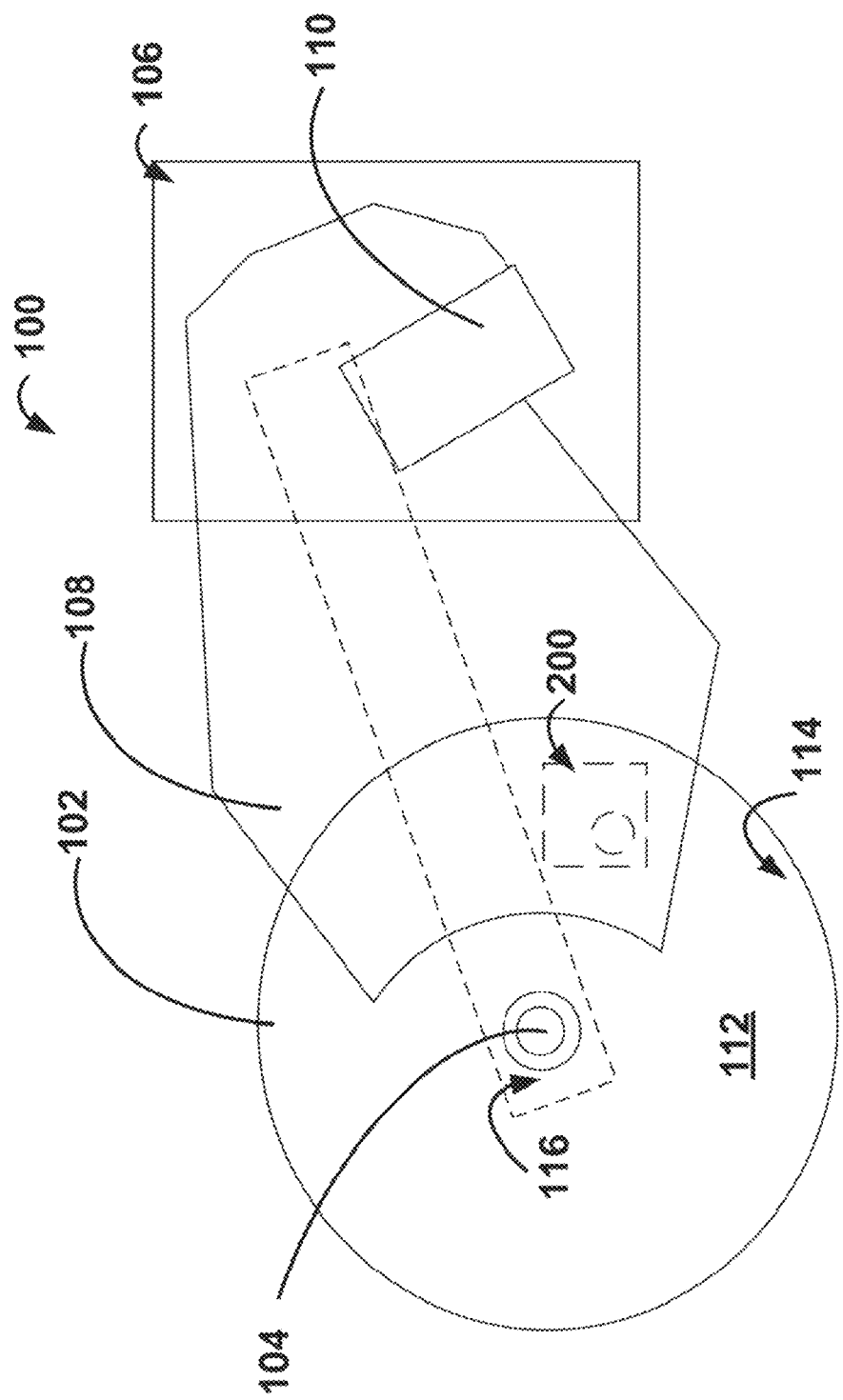
FIG. 1 is a schematic diagram of an example saw.

With reference to FIG. 1, an example schematic of a saw 100 is shown. The saw 100 may be any type of saw system and/or machine having one or more moving blades. While FIG. 1 illustrates a single blade 102 this is for example purposes only. In this example, the blade 102 is a rotatable blade. The one or more blades 102 may be one or more circular blades each comprising a plurality of teeth. The one or more blades 102 may be mountable on a tool component 104 which may be a mandrel, arbor or any other suitable component that may be controlled to rotate the one or more blades 102. The saw 100 may comprise a saw guide assembly 106 having one or more guide arms 108 to guide the one or more blades 102. While FIG. 1 illustrates a single guide arm 108 this is for example purposes only. The saw guide assembly 106 and/or the one or more guide arms 108 may be mountable on a fastening component 110 which may be a clamping cylinder or other suitable component that may be used to prevent rotation of the one or more guide arms 108. The one or more guide arms 108 may be single sided (i.e., for engaging only a single saw blade) or double sided (i.e., for each side of a given guide arm to engage a respective saw blade). The saw 100 may vary depending on practical implementations. For example, in some embodiments, the saw 100 may be a bandsaw having a band of steel that runs over two wheels. Other types of saws are contemplated.

Figure 2A:
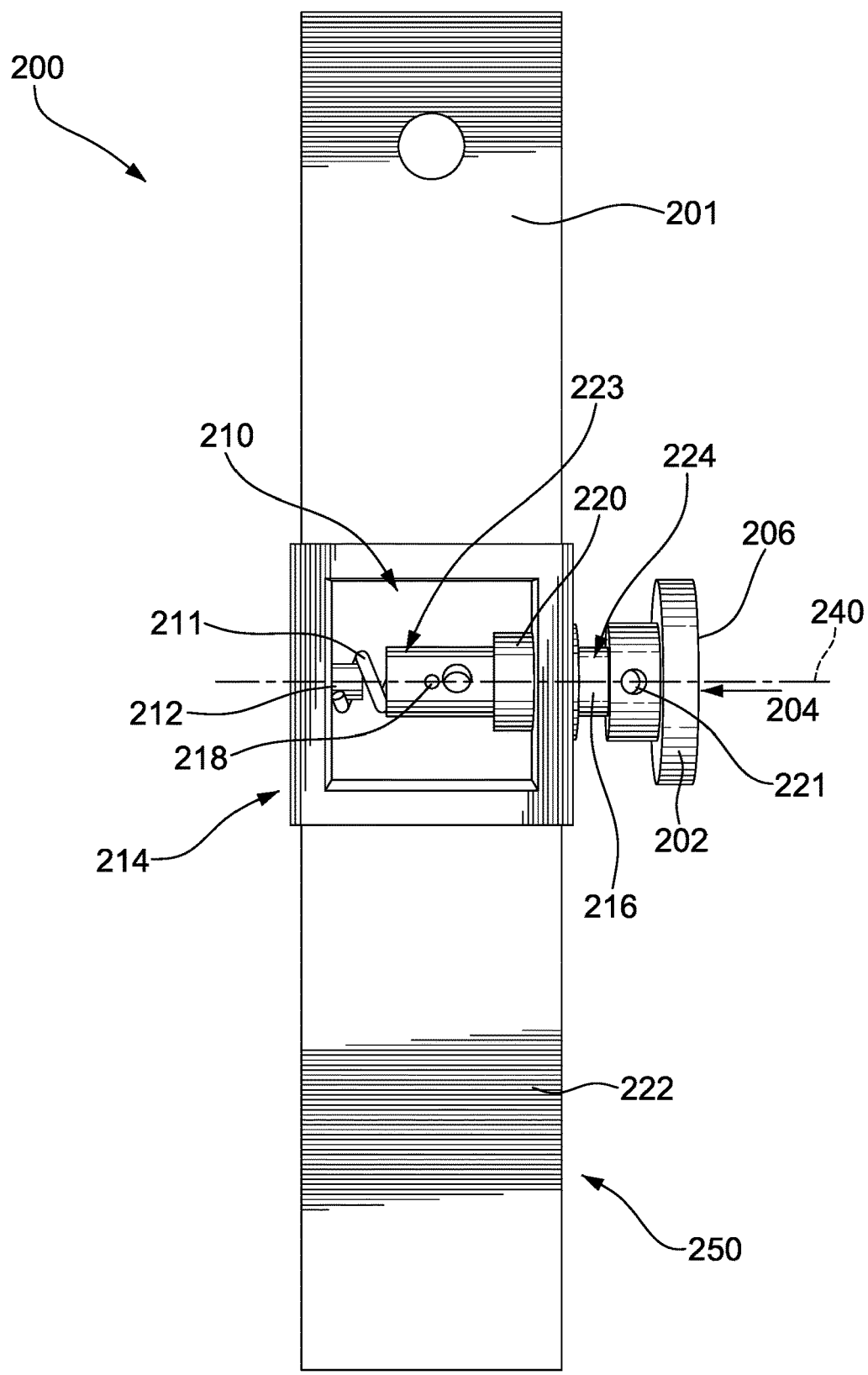
FIG. 2A is a schematic diagram of an example temperature sensor device in accordance with an embodiment.

With additional reference to FIG. 2A, an example schematic of a temperature sensor device 200 is shown. While the temperature sensor device 200 is described herein with reference to the saw 100, the temperature sensor device 200 may be used with other types of saws and/or with any other suitable fast moving surface. In accordance with an embodiment, the temperature sensor device 200 is mountable on the guide arm 108 of the saw 100 by any suitable fastening mechanism. For example, a mounting bracket 201 may be used to mount the temperature sensor device 200 on the guide arm 108. The mounting bracket 201 may comprise at least one aperture for receiving a bolt, screw or the like to fasten the mounting bracket 201 to the guide arm 108. The mounting bracket 201 may comprise at least one aperture for receiving a bolt, screw or the like to fasten the mounting bracket 201 to the temperature sensor device 200. The fastening mechanism may be integral with or provided separate from the temperature sensor device 200. Other fastening mechanisms are contemplated. Any suitable support arm of the saw and/or adjacent the saw may be used for mounting the temperature sensor device 200 thereto.

In accordance with an embodiment, the temperature sensor device 200 comprises a sensor body 202 comprising a temperature sensor 204 for measuring temperature of the blade 102. The sensor body 202 may be referred to as a sensor puck or a sensor holder. In accordance with an embodiment, the sensor body 202 has an engagement surface 206 for contacting a blade surface 112 of the blade 102. The sensor body 202 may be made, in whole or in part, of nylon, Teflon™, Delrin™ and/or any other suitable material. Accordingly, the engagement surface 206 may be made, in whole or in part, of nylon, Teflon™, Delrin™ and/or any other suitable material. In accordance with an embodiment, the engagement surface 206 is configured for being in continuous contact with the blade 102 during operation of the saw 100. The engagement surface 206 may be wearable such that as the blade 102 is moving (i.e., rotating in the case of blade 102), the engagement surface 206 may be worn.

In accordance with an embodiment, the sensor body 202 comprises the temperature sensor 204 embedded therein. For example, the temperature sensor 204 may comprises a thermistor embedded in the sensor body 202, which may be positioned proximate to the engagement surface 206. The thermistor may be any suitable thermistor that changes in resistance with changing temperature. The temperature sensor 204 may comprise any suitable passive and/or active electronic components. The temperature sensor 204 may vary depending on practical implementations.

In accordance with an embodiment, the temperature sensor device 200 comprises a biasing mechanism 210 coupled to the sensor body 202 for providing pressure to maintain the engagement surface 206 in contact with blade surface 112 while the blade 102 is moving (e.g., rotating in the case of blade 102). The implementation of the biasing mechanism 210 may vary depending on practical implementations. For example, the temperature sensor device 200 may comprise a housing 214 for containing at least in part the biasing mechanisms 210. In some embodiments, the biasing mechanism 210 comprises a spring 211. The spring 211 may be coupled to a guide pin 212 of the temperature sensor device 200. For example, the guide pin 212 may be attached to an inner wall of the housing 214. In some embodiments, the biasing mechanism 210 comprises a displaceable shaft 216 coupled to the spring 211 by a stop pin 218. In the illustrated embodiment, the displaceable shaft 216 is coupled to the spring 211 close to a first end 223 of the displaceable shaft 216. In some embodiments, the displaceable shaft 216 extends from the housing 214 via a bushing 220. The bushing 220 is configured to allow for the displaceable shaft 216 to be displaceable axially in the direction of an axis 240 shown on FIG. 2A. The displaceable shaft 216 is displaceable such that the spring 210 provides enough pressure to maintain the engagement surface 206 in contact with a blade surface 112 while the blade 102 is moving (e.g., rotating in the case of blade 102). In the illustrated embodiment, the sensor body 202 is removably coupled to the displaceable shaft 216 by an attachment pin 221. As illustrated, the sensor body 202 is coupled to the displaceable shaft 216 at a second end 224 of the displaceable shaft 216 opposite the first end 223. The configuration of the attachment pin 221 and the displaceable shaft 216 allows for the sensor body 202 to pivot about the displaceable shaft 216. In the illustrated embodiment, the sensor body 202 pivots about the attachment pin 221 at the second end 224 of the displaceable shaft 216. This pivoting action of the sensor body 202 may allow the engagement surface 206 to pivot with the blade surface 112 in the event that the blade 102 deflects. For example, when the blade 102 is moving and not cutting an object, the blade 102 has an operating position; however, when the blade 102 is cutting an object it is possible for the object to cause the blade 102 to deflect (e.g., bend, swerve or turn) from the operating position.

Figure 2B:
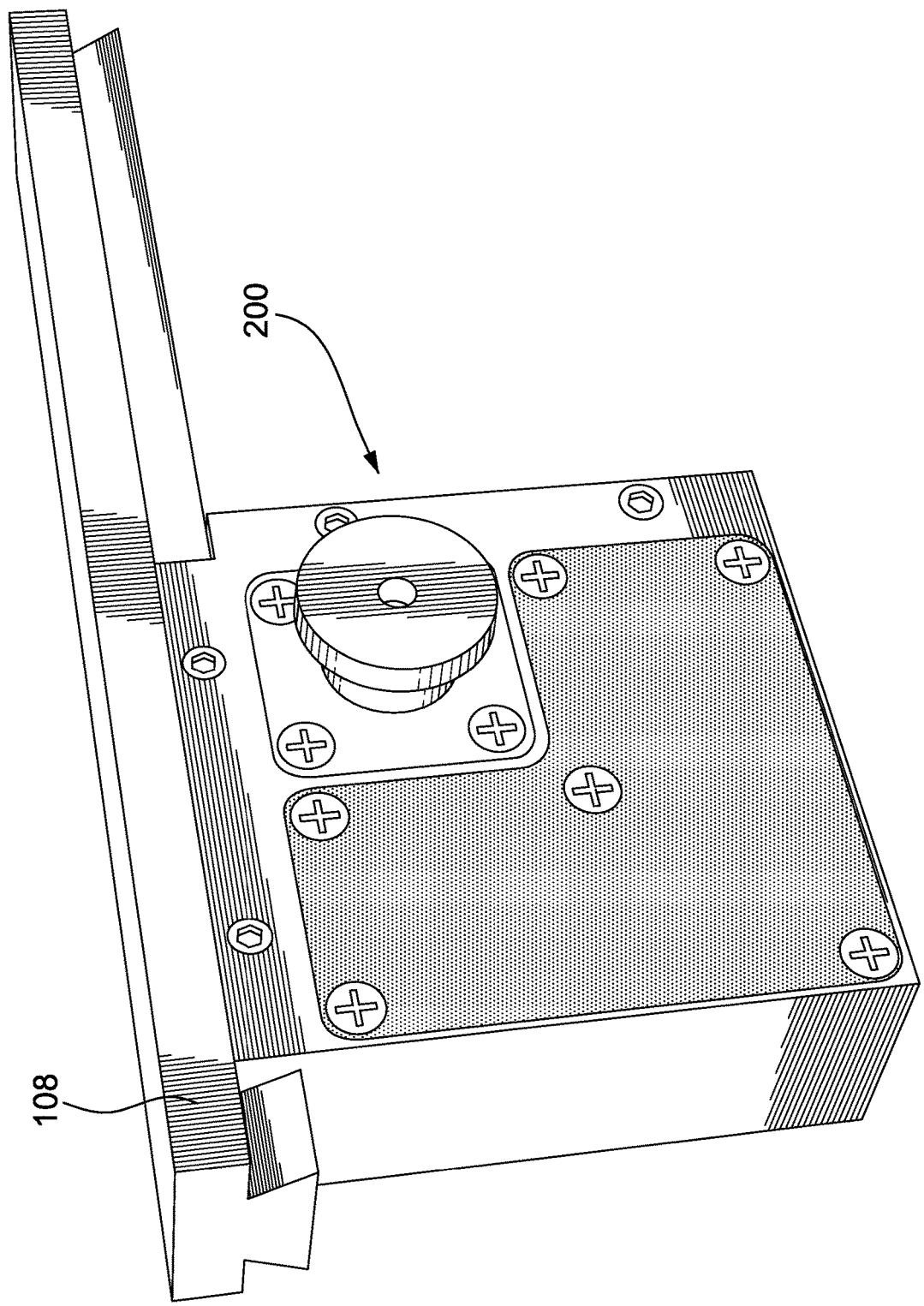
FIG. 2B is an example of a temperature sensor device in accordance with an embodiment.
Figure 2C:
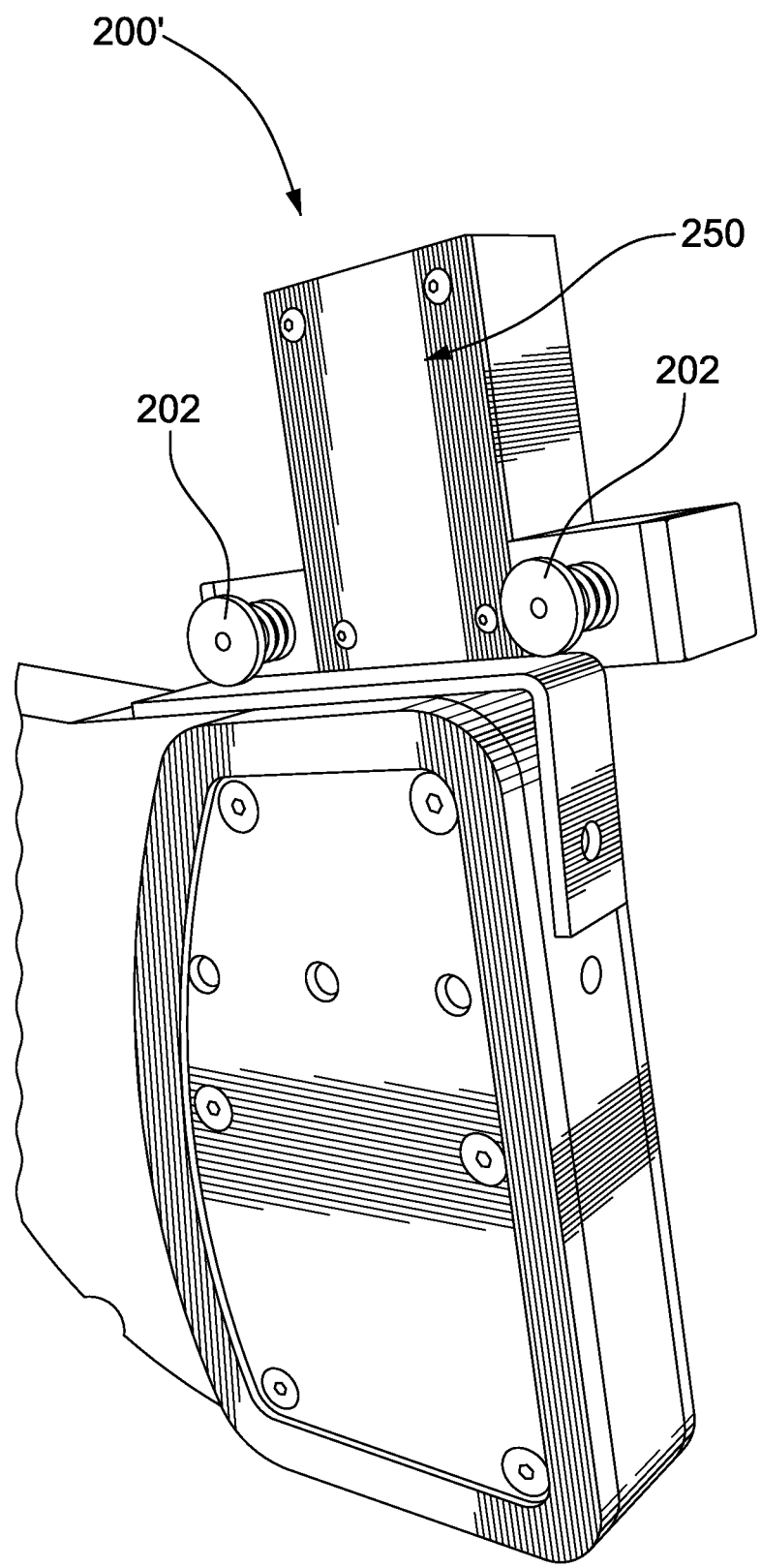
FIG. 2C is an example of temperature sensor device having two sensors mounted on a guide arm in accordance with an embodiment.
Figure 2D:
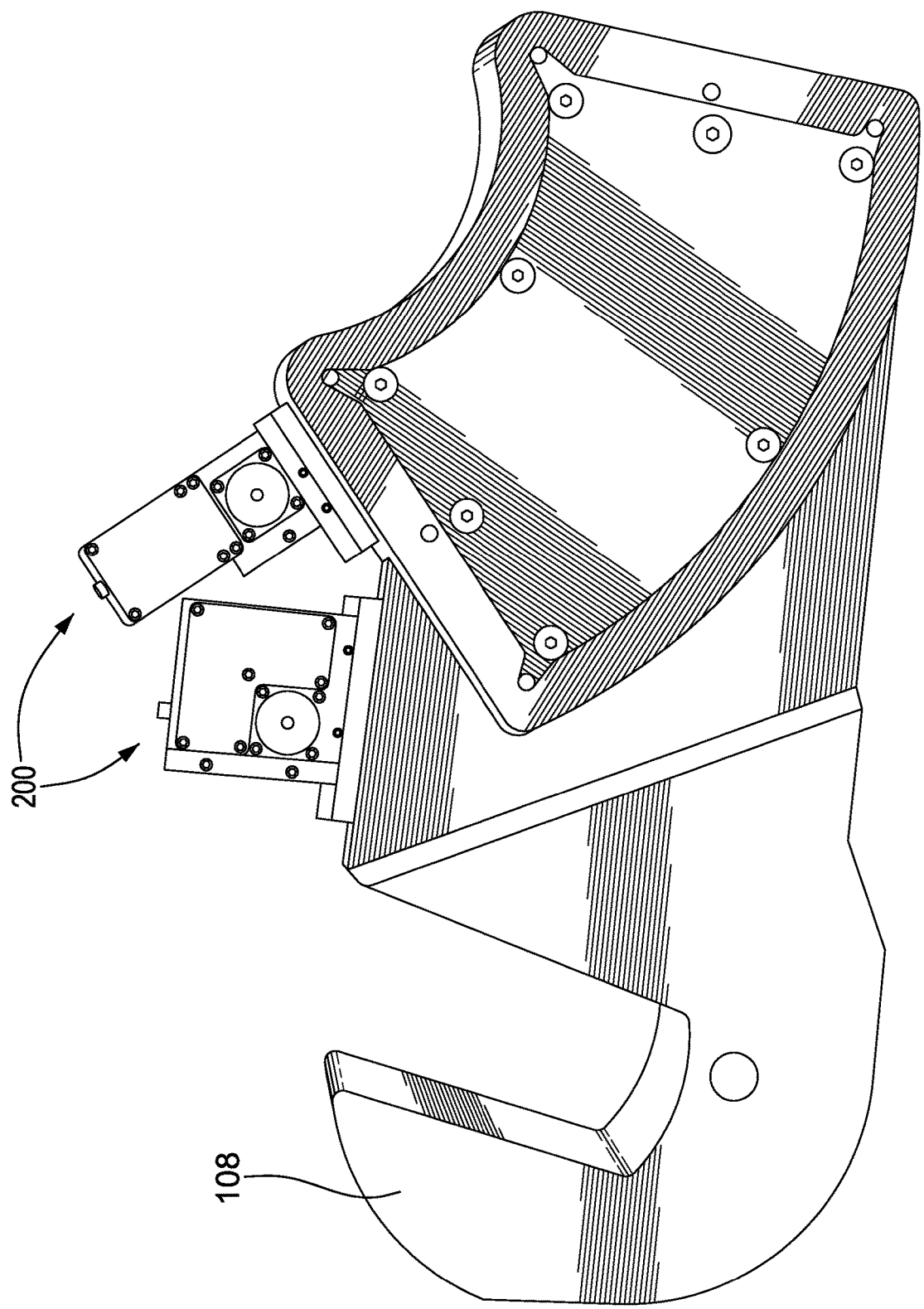
FIG. 2D is an example of two temperature sensor devices mounted on a guide arm in a first configuration in accordance with an embodiment.
Figure 2E:
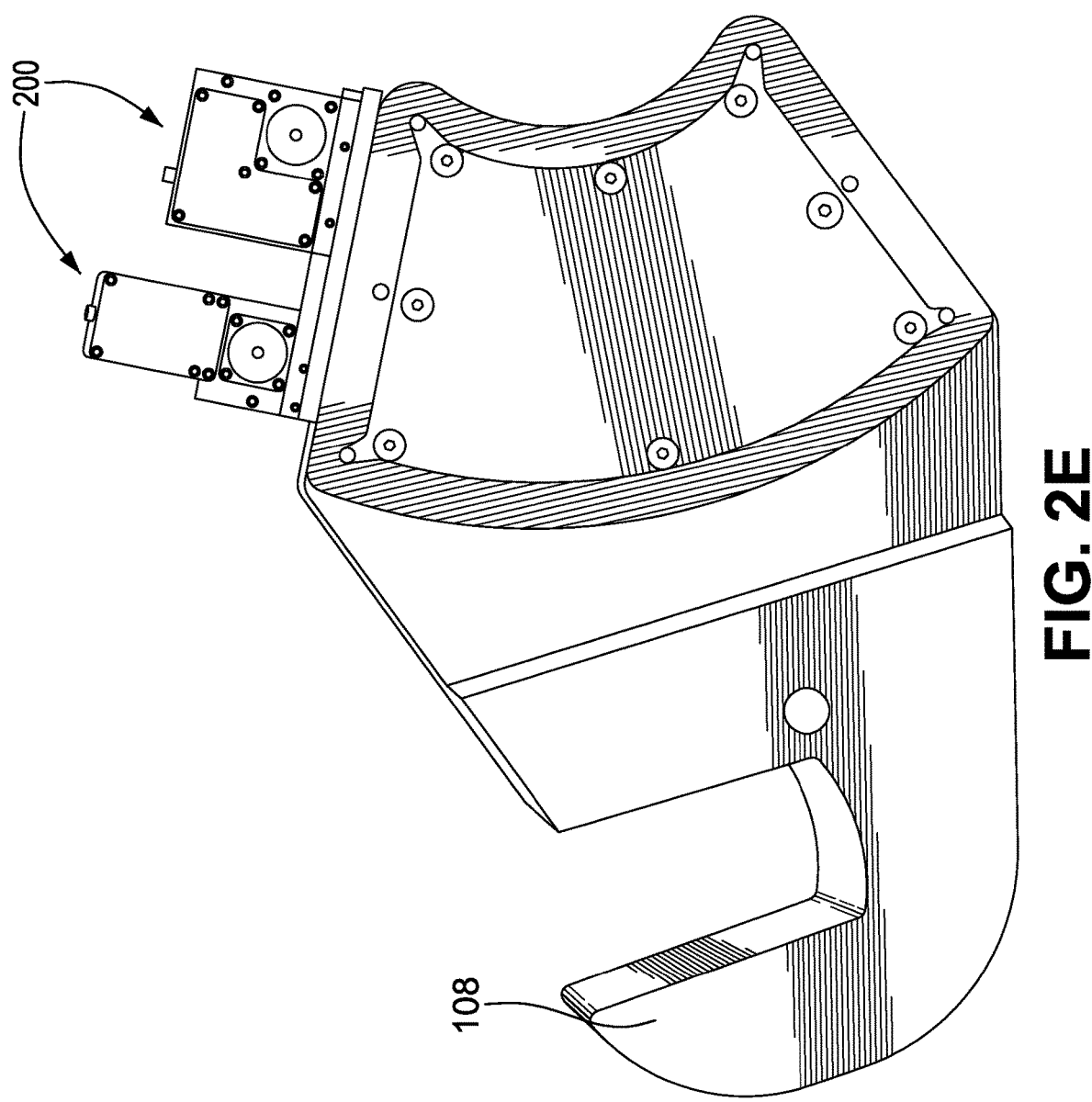
FIG. 2E is an example of two temperature sensor device mounted on a guide arm in a second configuration in accordance with an embodiment.
Figure 2F:
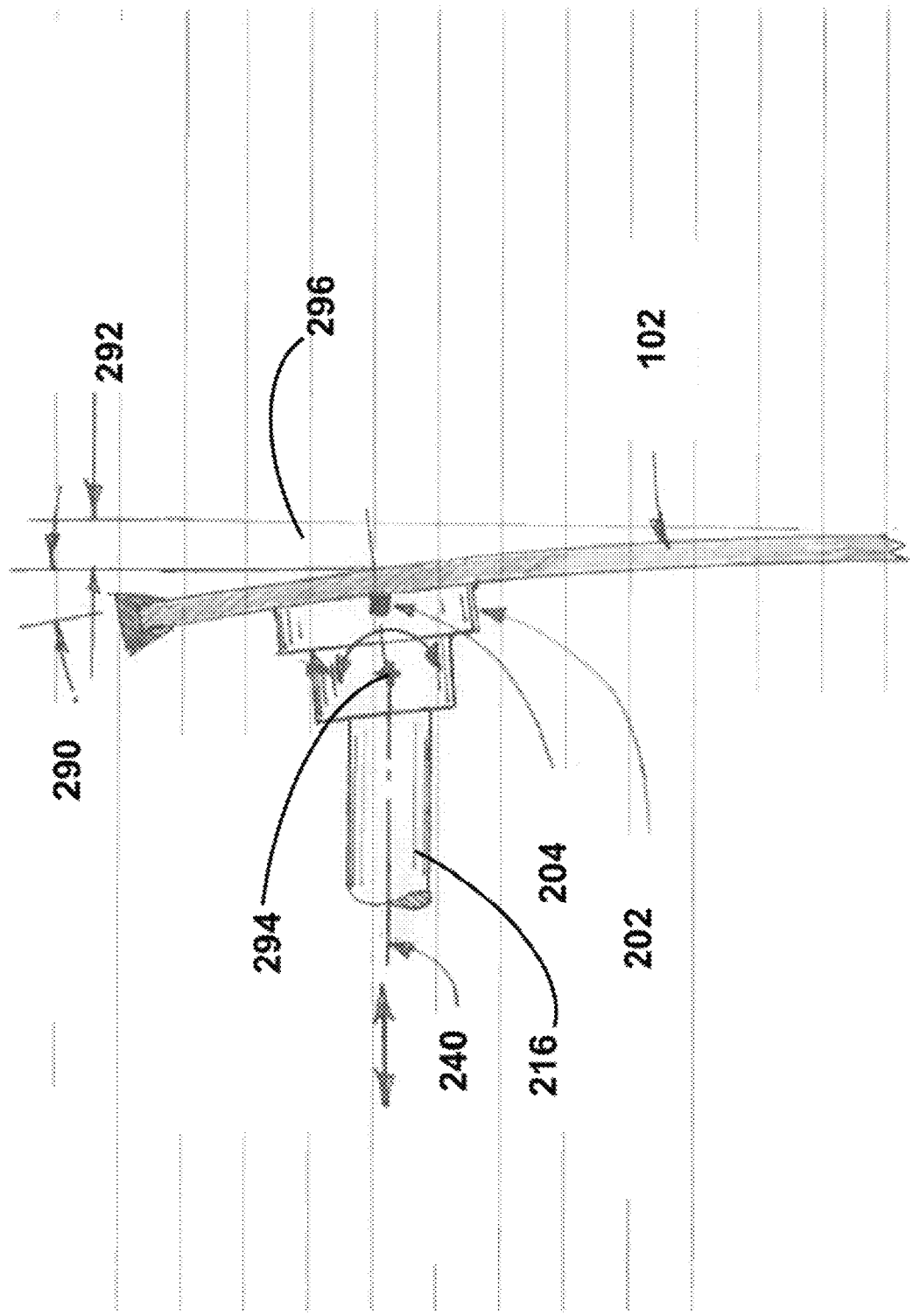
FIG. 2F is a schematic diagram of an example temperature sensor device adjusting with a deflecting saw blade in accordance with an embodiment.

With additional reference to FIG. 2F, an example illustrates the temperature sensor device 200 adjusting with a deflecting blade 102. As illustrated, the blade 102 is deflecting which causes an angular displacement 290 and an axial displacement 292 of the blade 102. The biasing mechanism 210 is configured to adjust with the angular displacement 290 and the axial displacement 292. The displaceable shaft 216 is configured to displace axially to adjust with the axial displacement 292 of the blade 102 and the pivoting action of the sensor body 202 allows for the sensor body 202 to pivot with the angular displacement 290 of the blade 102. As illustrated, the sensor body 202 pivots with the blade surface 112 as the blade 102 pivots from the operating position 296. The sensor body 202 pivots about a pivot axis 294 that is at a right angle to the axis 240 of the displaceable shaft 216. Accordingly, the engagement surface 206 of the sensor body 202 pivots with the blade surface 112 when the blade deflects. The engagement surface 206 of the sensor body 202 maintains contact with the blade surface 112 as the blade 102 pivots from the operating position 296. In the illustrated embodiment, the temperature sensor 204 of the sensor body 202 maintains contact with the blade surface 112 as the blade 102 pivots from the operating position 296.

Thus, in accordance with an embodiment, the biasing mechanism 210 is configured for providing pressure to maintain the engagement surface 206 in contact with a moving surface (e.g., the blade surface 112) while the moving surface (e.g., the blade surface 112) is moving and for allowing the engagement surface 206 to pivot with the moving surface (e.g., the blade surface 112) when the moving surface (e.g., the blade surface 112) deflects, where the engagement surface 206 pivots about the pivot axis 294 at a right angle to the axis 240.

In accordance with an embodiment, the biasing mechanism 210 is configured for maintaining the engagement surface 206 in contact with blade surface 112 while the blade surface 112 is moving at least at 700 feet per minute. In accordance with an embodiment, the biasing mechanism 210 is configured for maintaining the engagement surface 206 in contact with blade surface 112 while the blade surface 112 is moving at least at 10,000 feet per minute. In accordance with an embodiment, the biasing mechanism 210 is configured for maintaining the engagement surface 206 in contact with blade surface 112 while the blade surface 112 is moving at least at 15,000 feet per minute. In accordance with an embodiment, the biasing mechanism 210 is configured for maintaining the engagement surface 206 in contact with blade surface 112 while the blade surface 112 is moving up to 20,000 feet per minute.

In accordance with an embodiment, the biasing mechanism 210 is configured for maintaining the engagement surface 206 in contact with blade surface 112 while the blade surface 112 is moving in a range of 700 to 10,000 feet per minute. In accordance with an embodiment, the biasing mechanism 210 is configured for maintaining the engagement surface 206 in contact with blade surface 112 while the blade surface 112 is moving in a range of 700 to 20,000 feet per minute. In accordance with an embodiment, the biasing mechanism 210 is configured for maintaining the engagement surface 206 in contact with blade surface 112 while the blade surface 112 is moving in a range of 1,000 to 10,000 feet per minute. In accordance with an embodiment, the biasing mechanism 210 is configured for maintaining the engagement surface 206 in contact with blade surface 112 while the blade surface 112 is moving in a range of 1,000 to 20,000 feet per minute. In accordance with an embodiment, the biasing mechanism 210 is configured for maintaining the engagement surface 206 in contact with blade surface 112 while the blade surface 112 is moving in a range of 10,000 to 20,000 feet per minute.

It should be appreciated that such a configuration of the sensor body 202 and the biasing mechanism 210 may allow for accurate temperature readings of a saw blade moving at high speed during cutting.

In some embodiments, the engagement surface 206 is lubricated by a lubricant for reducing wear of the engagement surface 206. For instance, the saw 100 may be configured to provide lubricant to the engagement surface 206 via one or more lubricant grooves or pathways. For example, the saw 100 and/or the guide arm 108 may implement the guide lubrication system described in US Patent Application Publication No. 2016/0008897, the contents of which are hereby incorporated by reference. Use of other guide lubrication systems is contemplated. While lubricating the engagement surface 206 may minimize the wear rate of the engagement surface 206, the sensor body 202 may need to be replaced regularly (e.g., daily, multiple times per a week, weekly, etc.). In some embodiments, the sensor body 202 may be removable coupled to the biasing mechanism 210. Alternatively, while not preferred, the sensor body 202 may be coupled to the biasing mechanism 210 in a manner such that it is fixed thereto (i.e., not removable).

In accordance with an embodiment, the temperature sensor device 200 comprises an electronics module 250 connected to the temperature sensor 204 for determining temperature data indicative of the temperature of the blade 102. In the illustrated embodiment, the electronics module 250 is housed in an electronics housing 222. The electronics housing 222 may be made of plastic, metal and/or any other suitable material. The electronics module 250 may comprise any suitable electronic components for obtaining temperature measurements from the temperature sensor 104. The temperature measurements may be obtained either dynamically in real time when needed, regularly in accordance with any predetermined time interval, or irregularly. The temperature data corresponds to data, information or the like that represents the temperature measurements at the blade 102 of the saw 100 as measured by the temperature sensor 204. The electronics module 250 may be connected to the temperature sensor 100 by any suitable wiring, bus or the like.

Figure 3:
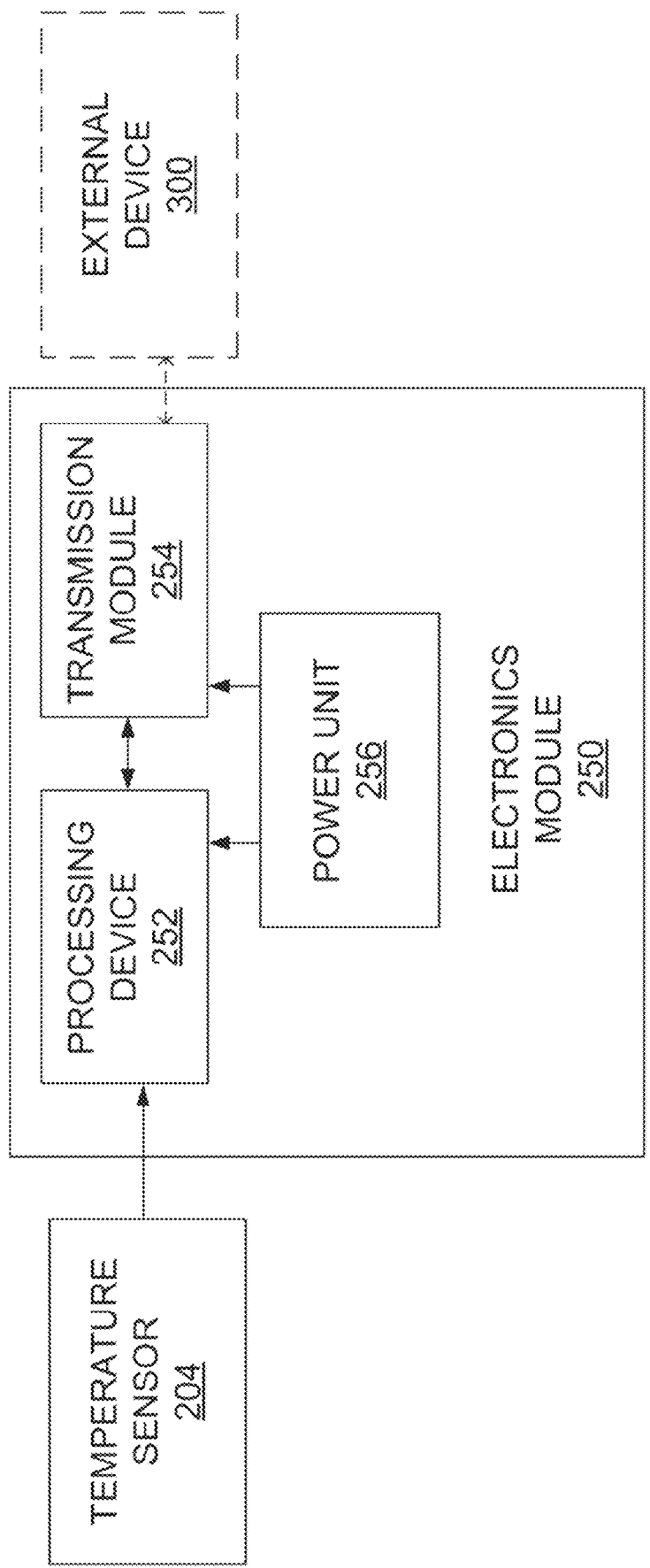
FIG. 3 is a block diagram of an example electronics module having a processing device in communication with a temperature sensor.

The electronics module 250 is configured for transmitting the temperature data to an external device 300 (e.g., as shown in FIG. 3). The temperature data is transmitted either dynamically in real time when needed, regularly in accordance with any predetermined time interval, or irregularly. The temperature data may be stored in the electronics module 250 and may be retrieved by the external device 300. The electronics module 250 may actively transmit the temperature data to the external device 300. The electronics module 250 may vary depending on practical implementations.

The external device 300 may be any suitable computer, server, networked device or the like. The external device 300 may be a networked device that provides the temperature data to a data network such as a personal area network (PAN), a local area network (LAN), a metropolitan area networks (MAN), a wide area networks (WAN), a cellular network, mobile communications network, the Internet and/or any other suitable network. The data network may be a network at a mill at which the saw 100 is located.

In some embodiment, the housing 214 for the biasing mechanism 210 and the electronics housing 222 may be separate housings. In some embodiments, the housing 214 and the electronics housing 222 may be a single housing. FIG. 2B illustrates an example of the temperature sensor device 200 in accordance with an embodiment. In this example, a single housing contains the biasing mechanism 210 and the electronics module 250. In this specific and non-limiting example, the temperature sensor device 200 is mountable on the guide arm 108 by slideably interlocking components and two bolts.

While the temperature sensor device 200 in the example of FIGS. 2A and 2B is shown to only comprise a single sensor body 202 this is for example purposes. The temperature sensor device 200 may comprise one or more sensor bodies of the type of the sensor body 202. With reference to FIG. 2C, a temperature sensor device 200' is a variant of the temperature sensor device 200. The temperature sensor device 200' comprises two sensor bodies 202 each comprising the temperature sensor 204. Accordingly, the electronics modules 250 may be configured to obtain temperature measurements from a plurality of temperature sensors of the type of the temperature sensor 204 and transmit temperature data corresponding to the temperature measurements from the plurality of temperature sensors to the external device 300. In this example, the two sensor bodies 202 are mounted on the guide arm 108 such that one is positioned near a rim 114 of the blade 102, and the other near an eye 116 of the blade 102 to measure the temperatures at two positions of the blade 102. As illustrated in FIG. 1, the rim 114 refers to an outer rim of the blade 102 and the eye refers to an inner eye rim of the blade 102. For example, by measuring temperature at these two positions a temperature difference may be determined. From the temperature difference, saw blade stiffness may be determined. The temperature at the rim 114 and the eye 116 may be measured because the difference between the temperature at the rim 114 and the eye 116 may have adverse effect on saw blade stiffness. For example, if the eye 116 is hotter than the rim 114, then the blade 102 may turn to a dish shape. By way of another example, if the rim 114 is hotter than the eye 116, then the rotatable blade may twist, and as the result the cutting would typically not be straight. The saw blade stiffness is of importance, as it typically determines the stability of the blade 102 and the deviation of cutting.

In some embodiments, one or more temperature sensor devices of the type of the temperature sensor device 200 may be used. FIG. 2D is an example of two temperature sensor devices 200 mounted on the guide arm 108 in a first configuration, in accordance with an embodiment. FIG. 2E is an example of two temperature sensor devices 200 mounted on the guide arm 108 in a second configuration, in accordance with an embodiment. The positioning of the two temperature sensor devices 200 may be determined such that one temperature sensor device is positioned near the rim 114 of the blade 102, and another temperature sensor device is posited near the eye 116 of the blade 102 to measure the temperatures at two positions of the blade 102. The positioning of one or more temperature sensor devices 200 on the guide arm 108 or other supporting bracket may vary depending on practical implementation.

With reference to FIG. 3, an example schematic of the electronics module 250 is shown. In accordance with an embodiment, the electronics module 250 comprises a processing device 252 connected to the temperature sensor 204. The processing device 252 determines the temperature data from the temperature sensor. For example, if the temperature sensor is a thermistor to the electronics module 250 by wires, the processing device 252 may measure an amount of current passing through the thermistor, as if the temperature changes the amount of current passing through the thermistor changes. The processing device 252 may then process data representing the measured current to determining the temperature data. In accordance with an embodiment, the electronics module 250 comprises a transmission module 254 for transmitting the temperature data from the processing device 252 to the external device 300. In some embodiments, the transmission module 254 is a wireless transmission module for wirelessly transmitting the temperature data to the external device 300. Alternatively, the transmission module 254 may be a wired module connected to the external device 300 over one or more data buses. In practical embodiments where the transmission module 254 is a wireless transmission module, this eliminates the need for any cabling to the guide arms 108 for obtaining the temperature data. The wireless transmission module may wirelessly transmit the temperature data according to Wi-Fi™, Zigbee™, Bluetooth™, ultra-wideband (UWB), 3G, Long-Term Evolution (LTE), or any other suitable wireless transmission technique.

In accordance with an embodiment, the electronics module 250 comprises a power unit 256 for powering the processing device 252 and the transmission module 254. The power unit 256 may supply power over one or more power buses. In some embodiments, the power unit 256 is a rechargeable battery. In some embodiments, the power unit 256 is a replaceable battery. The electronics module 250 may be configured to consume minimal power such that the battery may last up to two weeks, for example. The power unit 256 may vary depending on practical implementations.

Figure 4:
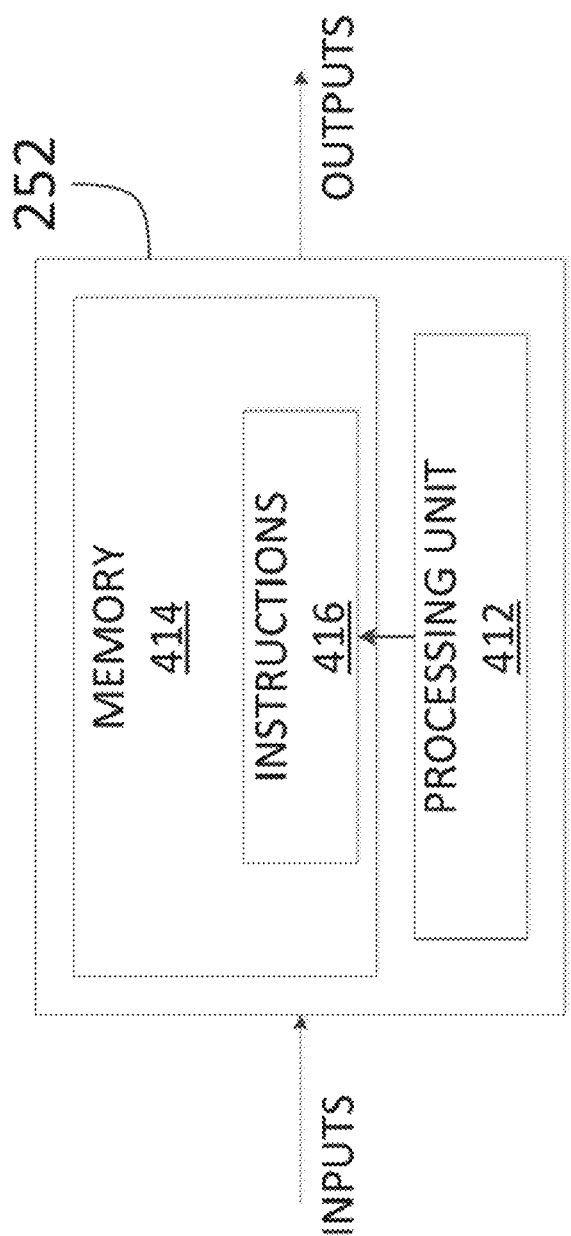
FIG. 4 is a block diagram of an example processing device in accordance with an embodiment.

With reference to FIG. 4, the processing device 252 may comprising a processing unit 412 and a memory 414 which has stored therein computer-executable instructions 416. The processing unit 412 may comprise any suitable devices configured to implement the system such that instructions 416, when executed by the processing device 252 or other programmable apparatus. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

Computer-executable instructions 416 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 5A:
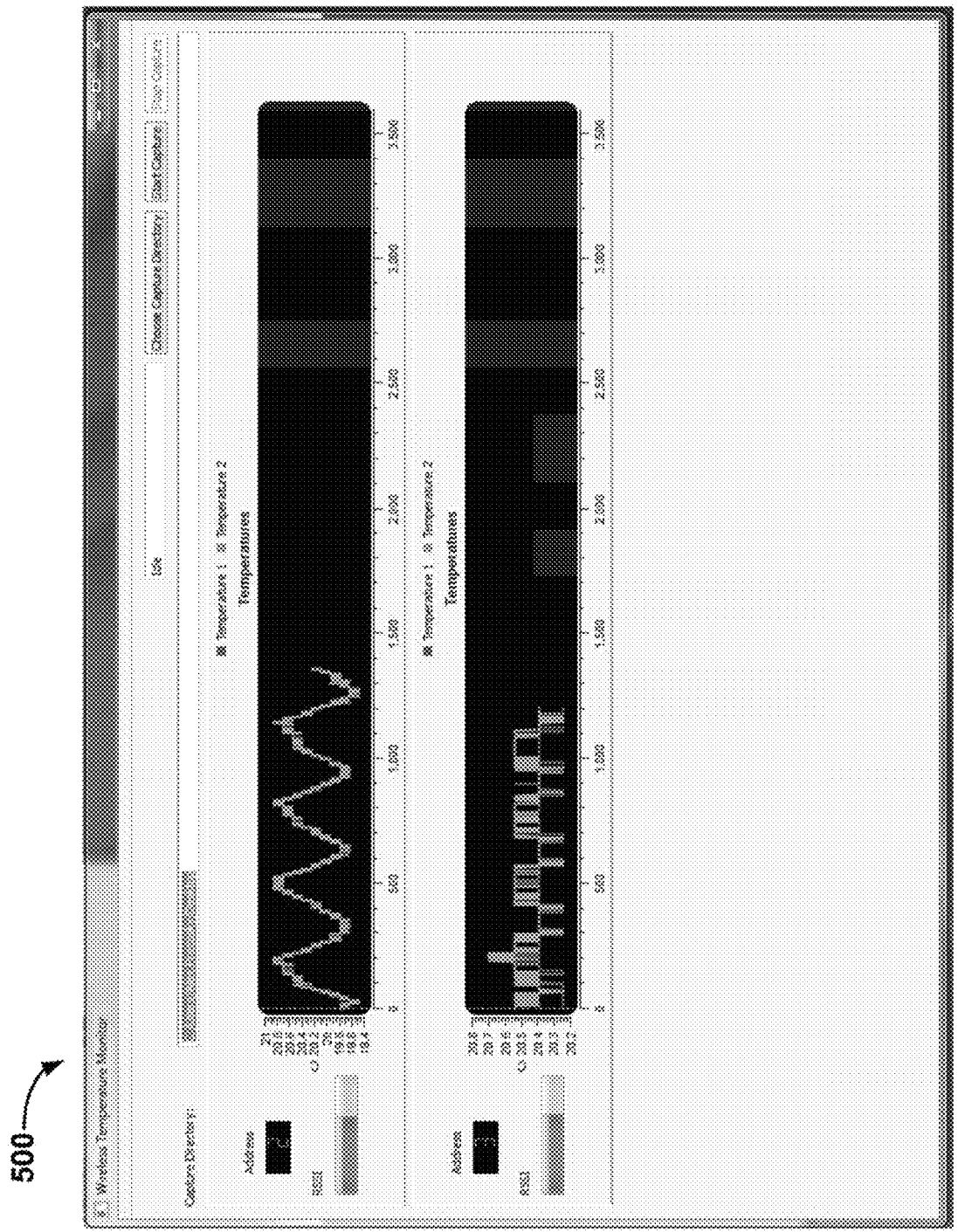
FIG. 5A is an example of a temperature sensor interface in accordance with an embodiment.
Figure 5B:
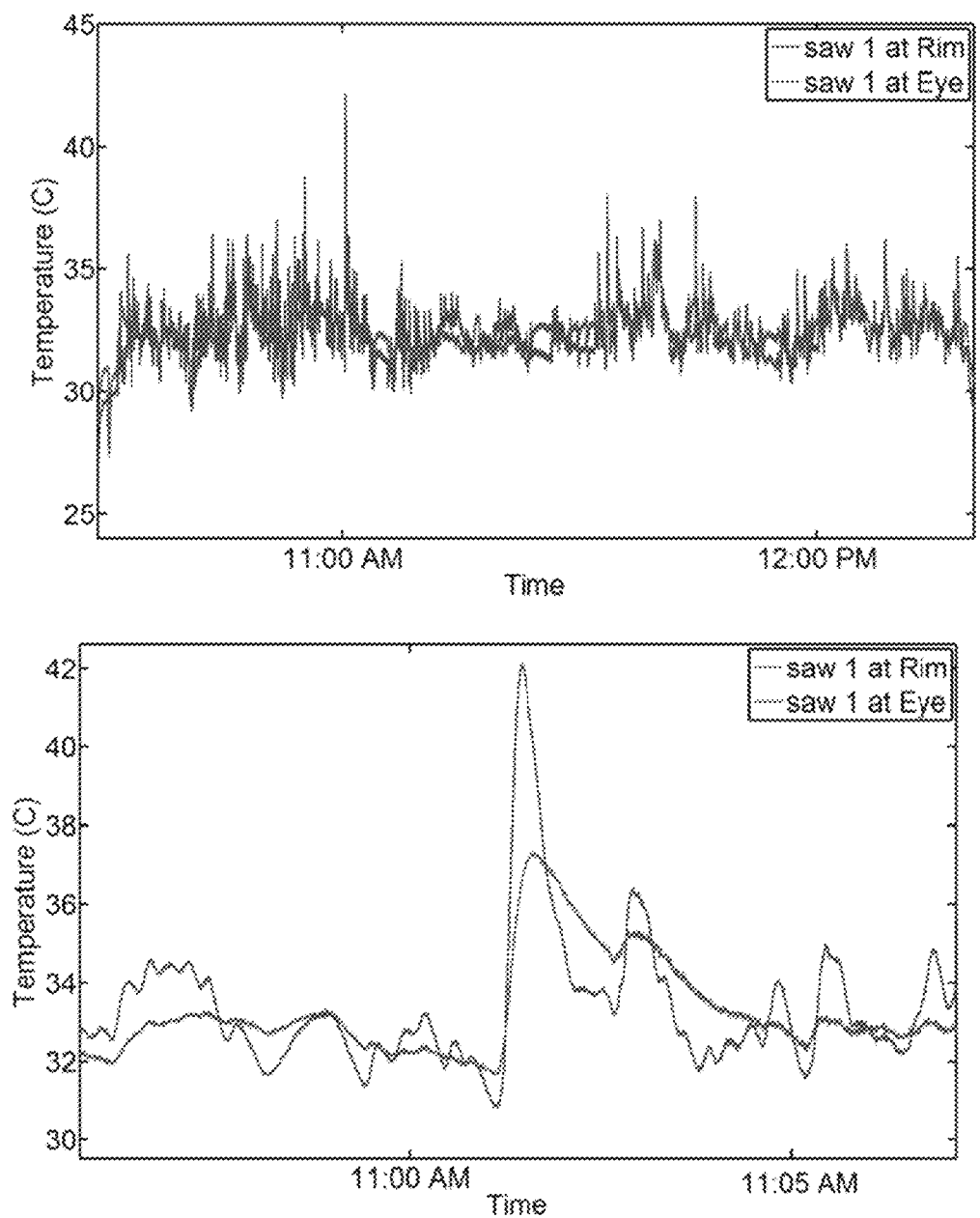
FIGS. 5B and 5C are example plots of temperature measured at a first blade and a second blade, respectively, in accordance with an embodiment.
Figure 5C:
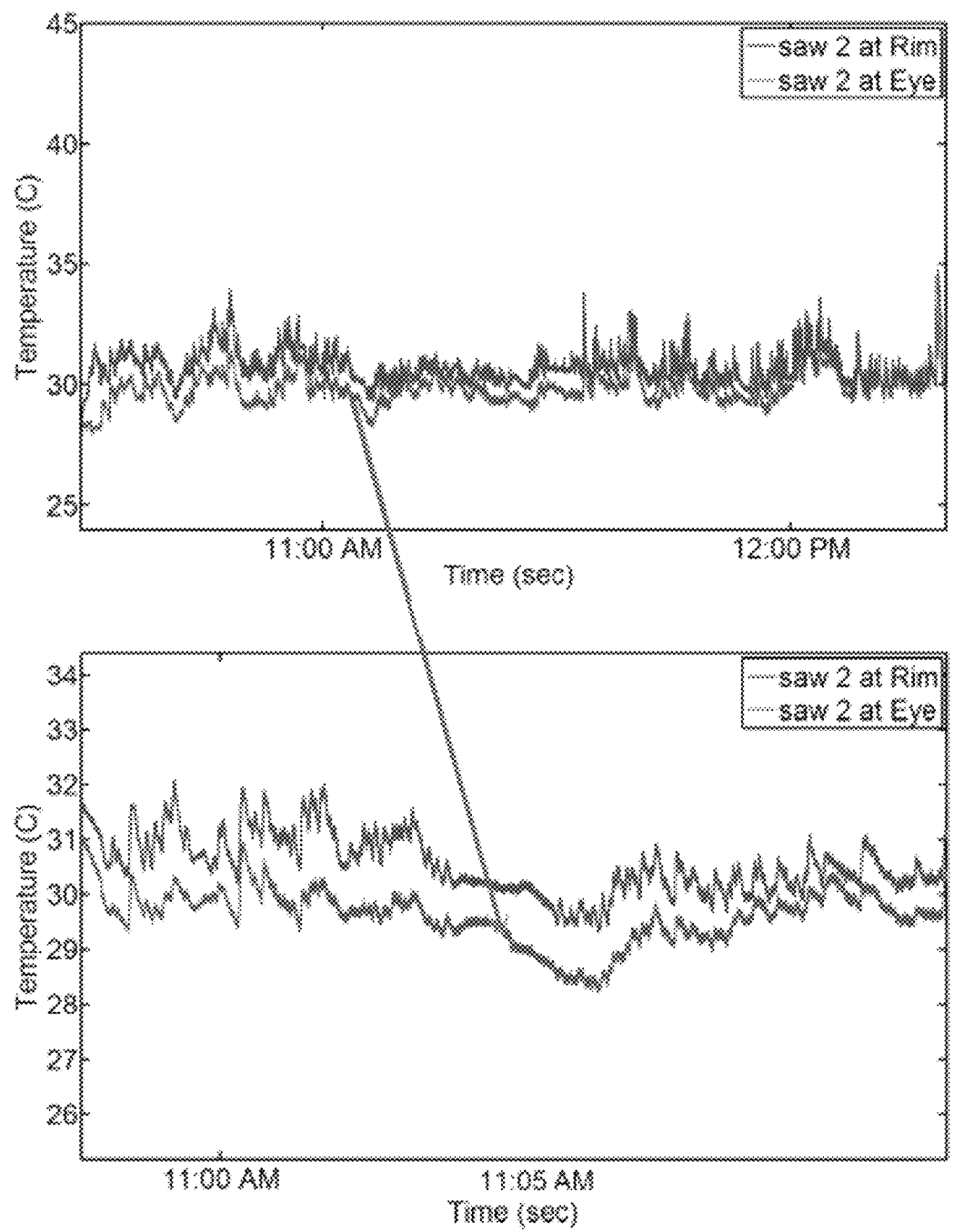

In some embodiments, the external device 300 may process the received temperature data and display a chart of the temperature changes over time on a user interface (e.g., via a display device). With reference to FIG. 5A, an example of a temperature sensor user interface 500 in illustrated. As shown, temperature of saw blades at two different mills is displayed. The temperature difference between the rim 114 and the eye 116 or the rotatable blade may be displayed as a plot on the user interface. FIGS. 5B and 5C, example plots of temperature measured on two different blades are respectively shown. A monitoring application running on the external device 300 may plot the temperatures at each temperature sensor device 200 and/or each sensor body 202 at each saw over time. In general, the temperature sensor device 200 may be used to provide sufficient data to alert saw operators to poor cutting, such as an increase in blade deviation, and identify systematic machine problems such as guide misalignment or a lack of coolant/lubricant in the system. Accordingly, the user interface 500 may provide warnings of undesirable temperature for each saw in a saw-box or the like. The temperature patterns may be collected.

The temperature sensor device 200 may be used continuously for day-to-day monitoring of saw temperature of some or all saw blades in a saw-box to provide sufficient data to alert saw operators about temperature change. The temperature sensor device 200 may be used installed when needed to trouble-shoot a sawing problem. For example, to quickly confirm or eliminate saw heating as a cause or symptom. The temperature sensor device 200 may be used for real-time feedback control of feed speed, guide coolant and/or guide lubricant.

The temperature data from the temperature sensor device 200 may be used by the external device 300 to optimize the amount of water and oil of the saw during cutting. This may reduce water and oil consumption, lessening issues with water pooling and corrosion. This may also result in dryer sawdust which may reduce shipping and drying costs.

The temperature sensor device 200 may be configured to withstand harsh conditions within a saw-box.

Accordingly, the external device 300 may implement a method for monitor the temperature of the saw 100 and adjust one or more parameters of the saw 100, for example, as described herein above.

The external device 300 may be implemented according to the configuration of the processing device 252 illustrated in FIG. 4.

While the temperature sensor device 200 is described herein as being mountable on the guide arm 108 of the saw 100, this is for example purposes only. In other embodiments, the temperature sensor device 200 may be mountable on any other suitable component of the saw 100.

While the temperature sensor device 200 is described herein as being used for measuring temperature of a rotatable blade of a circular saw, this is for example purposes only. In other embodiments, the temperature sensor device 200 may be used to measure temperature of any suitable blade and/or moving surface. For example, the temperature sensor device 200 may be used to measure temperature of a bandsaw. In the case of a bandsaw, the issue of a difference in temperature between a toothed edge and a back edge is similar to the need to measure the temperature difference between the rim and the eye of a circular saw. The design of the temperature sensor device 200 may not need to be changed for it to be used on a bandsaw; however, temperature sensor device 200 may not necessarily be mounted on a guide arm. For instance, there are other places where the temperature sensor device 200 may be mounted on a bandsaw where, for example, damage to the temperature sensor device 200 is less likely.

The temperature sensor device 200 may be used to measure temperature of any suitable movable surface and is not limited to use with saw blades. For example, the temperature sensor device may comprises a sensor body comprising a temperature sensor for measuring temperature of the moving surface. The sensor body has an engagement surface for contacting the moving surface. The temperature sensor device further comprises a biasing mechanism coupled to the sensor body for providing pressure to maintain the engagement surface in contact with moving surface and for allowing the engagement surface to pivot with the moving surface when the moving surface deflects. The temperature sensor device further comprises an electronics module connected to the temperature sensor for determining temperature data indicative of the temperature of the moving surface and for transmitting the temperature data to an external device.

The temperature sensor for measuring temperature of the moving surface may be able to operate at the speeds described elsewhere in this document in relation to the surface of the saw blade. In accordance with an embodiment, the biasing mechanism 210 is configured for maintaining the engagement surface 206 in contact with the moving surface while the moving surface is moving at least at 700 feet per minute. In accordance with an embodiment, the biasing mechanism 210 is configured for maintaining the engagement surface 206 in contact with the moving surface while the moving surface is moving at least at 10,000 feet per minute. In accordance with an embodiment, the biasing mechanism 210 is configured for maintaining the engagement surface 206 in contact with the moving surface while the moving surface is moving at least at 15,000 feet per minute. In accordance with an embodiment, the biasing mechanism 210 is configured for maintaining the engagement surface 206 in contact with the moving surface while the moving surface is moving up to 20,000 feet per minute. In accordance with an embodiment, the biasing mechanism 210 is configured for maintaining the engagement surface 206 in contact with the moving surface while the moving surface is moving in a range of 700 to 10,000 feet per minute. In accordance with an embodiment, the biasing mechanism 210 is configured for maintaining the engagement surface 206 in contact with the moving surface while the moving surface is moving in a range of 700 to 20,000 feet per minute. In accordance with an embodiment, the biasing mechanism 210 is configured for maintaining the engagement surface 206 in contact with the moving surface while the moving surface is moving in a range of 1,000 to 10,000 feet per minute. In accordance with an embodiment, the biasing mechanism 210 is configured for maintaining the engagement surface 206 in contact with the moving surface while the moving surface is moving in a range of 1,000 to 20,000 feet per minute. In accordance with an embodiment, the biasing mechanism 210 is configured for maintaining the engagement surface 206 in contact with the moving surface while the moving surface is moving in a range of 10,000 to 20,000 feet per minute.

Accordingly, the temperature sensor device 200 for measuring temperature of the movable surface may be mounted on any suitable support structure adjacent the movable surface.

A system for measuring temperature of a blade of a saw and/or any suitable moving surface may be implemented in a similar manner as the temperature sensor device 200. The system may include any of the aspects and/or embodiments described herein.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of temperature sensor device and system for measuring temperature may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A temperature sensor device for measuring temperature of a moving surface, the temperature sensor device comprising:
    a sensor body comprising a temperature sensor for measuring temperature of the moving surface, the sensor body having an engagement surface for contacting the moving surface;
    a biasing mechanism coupled to the sensor body for providing pressure to maintain the engagement surface in contact with the moving surface and for allowing the engagement surface to pivot with the moving surface when the moving surface deflects, the biasing mechanism comprising:
        a shaft displaceable axially in a direction of a first axis,
        an attachment pin for removably coupling the sensor body to the shaft and for allowing the engagement surface to pivot with a blade surface when the moving surface deflects, wherein the engagement surface is configured to pivot about a second axis at a right angle to the first axis, and
        a spring for providing pressure to the shaft for maintaining the engagement surface in contact with the blade surface while the blade is moving; and
    an electronics module connected to the temperature sensor for determining temperature data indicative of the temperature of the moving surface and for transmitting the temperature data to an external device.

2. The temperature sensor device of claim 1, wherein the moving surface is a sawing machine having a blade.

3. The temperature sensor device of claim 2, wherein the sawing machine comprises a circular saw and the blade is a rotatable blade.

4. The temperature sensor device of claim 2, wherein the temperature sensor device is mountable on a guide arm of the sawing machine.

5. The temperature sensor device of claim 1, wherein the temperature sensor comprises a thermistor embedded in the sensor body proximate to the engagement surface.

6. The temperature sensor device of claim 1, wherein the biasing mechanism is configured for maintaining the engagement surface in contact with the moving surface while the moving surface is moving at least at 700 feet per minute.

7. The temperature sensor device of claim 1, wherein the biasing mechanism is configured for maintaining the engagement surface in contact with the moving surface while the moving surface is moving at least at 10,000 feet per minute.

8. The temperature sensor device of claim 1, wherein the biasing mechanism is configured for maintaining the engagement surface in contact with the moving surface while the moving surface is moving up to 20,000 feet per minute.

9. The temperature sensor device of claim 1, wherein the biasing mechanism is configured for maintaining the engagement surface in contact with the moving surface while the moving surface is moving in a range of 700 feet per minute to 20,000 feet per minute.

10. The temperature sensor device of claim 1, wherein the biasing mechanism is configured for maintaining the engagement surface in contact with the moving surface while the moving surface is moving in a range of 10,000 feet per minute to 20,000 feet per minute.

11. A system for measuring temperature of a blade of a sawing machine, the system comprising:

a sensor body comprising a temperature sensor for measuring temperature of the blade, the sensor body having an engagement surface for contacting a blade surface of the blade;

a biasing mechanism coupled to the sensor body for providing pressure to maintain the engagement surface in contact with the blade surface while the blade is moving and for allowing the engagement surface to pivot with the blade surface when the blade deflects, the biasing mechanism comprising:

a shaft displaceable axially in a direction of a first axis, an attachment pin for removably coupling the sensor body to the shaft and for allowing the engagement surface to pivot with the blade surface when the moving surface deflects, wherein the engagement surface is configured to pivot about a second axis at a right angle to the first axis, and a spring for providing pressure to the shaft for maintaining the engagement surface in contact with the blade surface while the blade is moving; and an electronics module connected to the temperature sensor for determining temperature data indicative of the temperature of the blade and for transmitting the temperature data to an external device.

12. The system of claim 11, wherein the temperature sensor comprises a thermistor embedded in the sensor body proximate to the engagement surface.

13. The system of claim 11, wherein the biasing mechanism is configured for maintaining the engagement surface in contact with the blade surface while the blade surface is moving at least at 700 feet per minute.

14. The system of claim 11, wherein the biasing mechanism is configured for maintaining the engagement surface in contact with the blade surface while the blade surface is moving at least at 10,000 feet per minute.

15. The system of claim 11, wherein the biasing mechanism is configured for maintaining the engagement surface in contact with the blade surface while the blade surface is moving up to 20,000 feet per minute.

16. The system of claim 11, wherein the biasing mechanism is configured for maintaining the engagement surface in contact with the blade surface while the blade surface is moving in a range of 700 feet per minute to 20,000 feet per minute.

17. The system of claim 11, wherein the biasing mechanism is configured for maintaining the engagement surface in contact with the blade surface while the blade surface is moving in a range of 10,000 feet per minute to 20,000 feet per minute.

18. The system of claim 11, wherein the sawing machine comprises a circular saw and the blade is a rotatable blade.

* * * * *